US011922724B2

(12) United States Patent
Yang

(10) Patent No.: US 11,922,724 B2
(45) Date of Patent: Mar. 5, 2024

(54) FACE RECOGNITION METHOD UTILIZING A FACE RECOGNITION MODEL AND A FACE SAMPLE LIBRARY TO DETECT MASK IMAGES

(71) Applicant: HONG FU JIN PRECISION INDUSTRY (WuHan) CO., LTD., Wuhan (CN)

(72) Inventor: Chin-Wei Yang, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 367 days.

(21) Appl. No.: 17/598,453

(22) PCT Filed: Oct. 12, 2020

(86) PCT No.: PCT/CN2020/120265
§ 371 (c)(1),
(2) Date: Sep. 27, 2021

(87) PCT Pub. No.: WO2022/077139
PCT Pub. Date: Apr. 21, 2022

(65) Prior Publication Data
US 2022/0327864 A1 Oct. 13, 2022

(51) Int. Cl.
*G06V 40/00* (2022.01)
*G06T 7/73* (2017.01)
(Continued)

(52) U.S. Cl.
CPC .............. *G06V 40/172* (2022.01); *G06T 7/73* (2017.01); *G06V 10/771* (2022.01); *G06V 40/161* (2022.01)

(58) Field of Classification Search
CPC .. G06V 40/172; G06V 10/771; G06V 40/161; G06T 7/73
See application file for complete search history.

(56) References Cited

U.S. PATENT DOCUMENTS

| 2007/0036429 | A1* | 2/2007 | Terakawa | G06V 40/165 |
| | | | | 382/118 |
| 2020/0019758 | A1 | 1/2020 | Li et al. | |
| 2021/0073517 | A1* | 3/2021 | Ahmad | G06V 20/30 |

FOREIGN PATENT DOCUMENTS

| CN | 108875534 A | * 11/2018 |
| CN | 111460962 | 7/2020 |

(Continued)

*Primary Examiner* — Pakee Fang
(74) *Attorney, Agent, or Firm* — ScienBiziP, P.C.

(57) ABSTRACT

A device and a method and a non-transitory readable storage medium, for face recognition are provided, the method comprise: extracting a face sample image from a predetermined face sample library and performing feature point detection to obtain multiple face feature points; obtaining multiple mask images; selecting first to fourth face feature points from the multiple face feature points; defining a distance between the first and second face feature point as a mask image height, and defining a distance between the third and fourth face feature point as a mask image width; adjusting a size of each mask image according to the mask image height and the mask image width; fusing each adjusted mask image with the face sample image to obtain multiple face mask images to save into the predetermined face sample library; training a face recognition model based on the predetermined face sample library for face recognition.

17 Claims, 4 Drawing Sheets

(51) Int. Cl.
*G06V 10/771* (2022.01)
*G06V 40/16* (2022.01)

(56) References Cited

FOREIGN PATENT DOCUMENTS

| | | | |
|---|---|---|---|
| CN | 111582068 | | 8/2020 |
| CN | 111582199 | | 8/2020 |
| CN | 111695431 A | * | 9/2020 |
| CN | 109815845 B | * | 3/2022 |
| CN | 111582199 B | * | 5/2023 |
| WO | WO-2019071664 A1 | * | 4/2019 |

* cited by examiner

FACE RECOGNITION METHOD UTILIZING A FACE RECOGNITION MODEL AND A FACE SAMPLE LIBRARY TO DETECT MASK IMAGES

TECHNICAL FIELD

The subject matter herein generally relates to methods and devices for face recognizing, and non-transitory readable storage mediums.

BACKGROUND

The Coronavirus (COVID-19) pandemic is currently spreading in the world, and people are becoming more and more aware that epidemics can be spread by droplets. Therefore, people wear masks for protection against the COVID-19. However, in some public places (such as stations, shopping malls) and enterprises, face recognition systems are used as restrictions at entry and exit points. When people stand in front of the face recognition system while wearing masks, most likely, face recognition would result in a failure. In order to be recognized the face recognition system, people may take off their masks for face recognition. However, such behavior results in an increased risk of people getting infected by the COVID-19 virus.

SUMMARY

The application is intended to solve at least one of the technical problems in the prior art. In view of this, one aspect of the application is to provide a face recognition method, which may accurately perform face recognition even when people wear masks.

A face recognition method provided by one embodiment of the application, comprises: extracting face sample images from a predetermined face sample library; performing feature point detection on each of the face sample images to obtain multiple face feature points; obtaining multiple mask images, wherein each of the multiple mask images corresponds to one type of mask; selecting a first face feature point, a second face feature point, a third face feature point, and a fourth face feature point from the multiple face feature points, defining a distance between the first face feature point and the second face feature point as a mask image height, and defining a distance between the third face feature point and the fourth face feature point as a mask image width; adjusting a size of each of the multiple mask images according to the mask image height and the mask image width; fusing each of multiple adjusted mask images with the face sample image to obtain a plurality of face mask images; saving the plurality of face mask images to the predetermined face sample library; training a face recognition model based on the predetermined face sample library for face recognition.

In some embodiments, the face sample images of the predetermined face sample library comprise multiple human faces, and each of the multiple human faces comprises at least one face sample image, the method of training the face recognition model based on the predetermined face sample library comprises: training the face recognition model based on the predetermined face sample library when each of the face sample images of the predetermined face sample library is completed to fuse with the multiple mask images.

In some embodiments, the method prior to training the face recognition model based on the predetermined face sample library comprises: establishing a mapping relationship between each of the face sample images of the predetermined face sample library and face identity information, to make each of the face sample images carrying a face identity tag.

In some embodiments, the method prior to training the face recognition model based on the predetermined face sample library comprises: establishing a mapping relationship between each of the face sample images of the predetermined face sample library and mask wearing information, to make each of the face sample images carrying a mask wearing tag.

In some embodiments, the method of performing the feature point detection on the face sample images to obtain the multiple face feature points comprises: performing the feature point detection on the face sample images based on a predetermined face feature detection model; calibrating the multiple face feature points detected by the predetermined face feature detection model, adding a serial number to each of the multiple face feature points, and selecting face feature points with specified serial numbers as the first face feature point, the second face feature point, the third face feature point, and the fourth face feature point.

In some embodiments, the method of adjusting the size of each of the multiple mask images according to the mask image height and the mask image width comprises: performing a scaling process on each of the multiple mask images, wherein a height of each of the multiple mask images is equal to the mask image height, and a width of each of the multiple mask images is equal to the mask image width.

In some embodiments, the method of fusing each of multiple adjusted mask images with the face sample image to obtain the plurality of face mask images comprises: fusing each of multiple adjusted mask images with the face sample image based on an OpenCV algorithm to obtain the plurality of face mask images.

In some embodiments, the method prior to extracting the face sample images from the predetermined face sample library comprises: performing a preliminary process on each face sample image of the predetermined face sample library, wherein the preliminary process is selected from a group consisting of: face image righting, face image enhancing, and face image normalization.

Another aspect of the application provides a face recognition device, comprising a processor and a data storage, wherein the data storage stores multiple computer instructions, and the processor is configured to execute the multiple computer instructions stored in the data storage to realize the above face recognition method.

Another aspect of the application provides a non-transitory readable storage medium storing multiple computer instruction, wherein when the multiple computer instructions run on one or more processors, the processors run the above face recognition method.

According to the face recognition device, the face recognition method, and the non-transitory readable storage medium of the embodiments of the application, faces can be accurately recognized even when people wear masks, and face recognition experience is more convenient for the people.

BRIEF DESCRIPTION OF THE DRAWINGS

Implementations of the present technology will now be described, by way of example only, with reference to the attached figures.

REFERENCE SIGNS OF MAIN ELEMENTS

Figure 1:
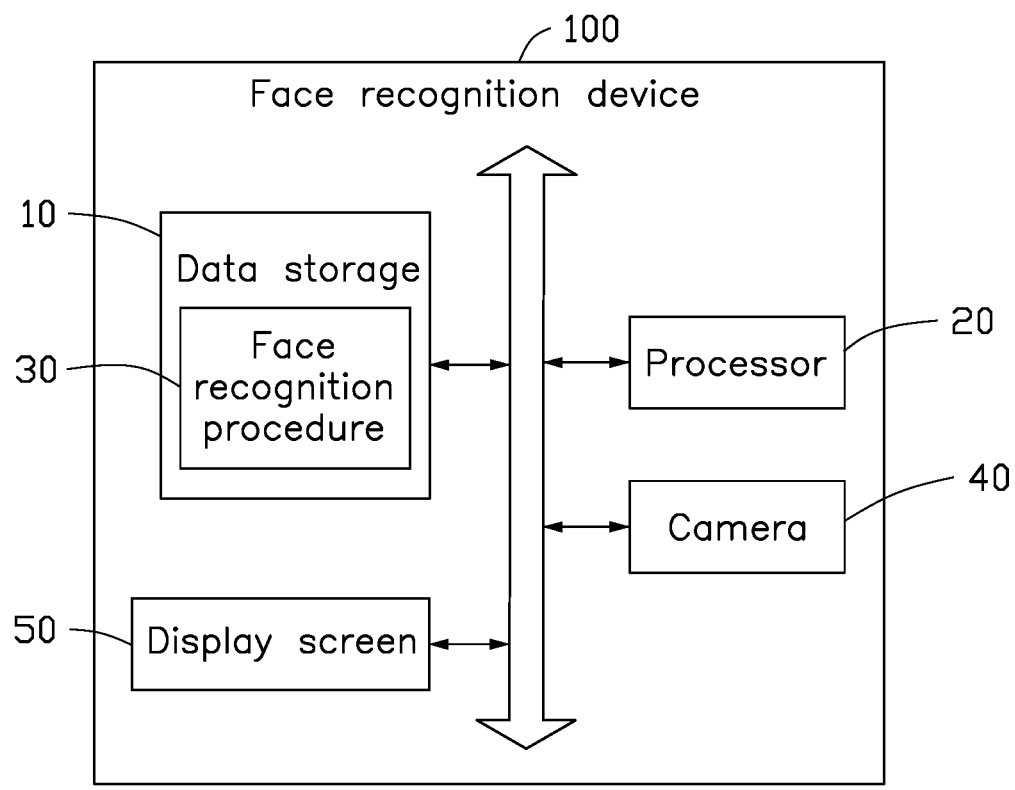
FIG. 1 is a block diagram of an embodiment of a face recognition device according to the present disclosure.

| Data storage | 10 |
| Processor | 20 |
| Face recognition procedure | 30 |
| Camera | 40 |
| Display screen | 50 |
| Extracting module | 101 |
| Detecting module | 102 |
| Obtaining module | 103 |
| Selecting module | 104 |
| Adjusting module | 105 |
| Fusing module | 106 |
| Saving module | 107 |
| Training module | 108 |
| Face recognition device | 100 |

DETAILED DESCRIPTION

The embodiments of the application are described in detail below. The examples of the embodiments are shown in the drawings, and the same or similar reference numerals are included throughout the drawings to describe the same or similar elements or elements with the same or similar functions. The following embodiments with reference to the drawings are exemplary, and are used to describe the application, the description is not to be considered as limiting the scope of the embodiments herein.

The term "comprising," when utilized, means "including, but not necessarily limited to"; it specifically indicates open-ended inclusion or membership in the so-described combination, group, series and the like, so that a process, a method, an article or a device comprising a series of elements not only comprises those elements, but also comprises other elements that are not explicitly listed. Without more restrictions, the element defined by a sentence "comprising a . . . " does not exclude other elements in the process, the method, the article, or the device.

FIG. 1 illustrates a diagram of an embodiment of a face recognition device of the application.

Figure 4:
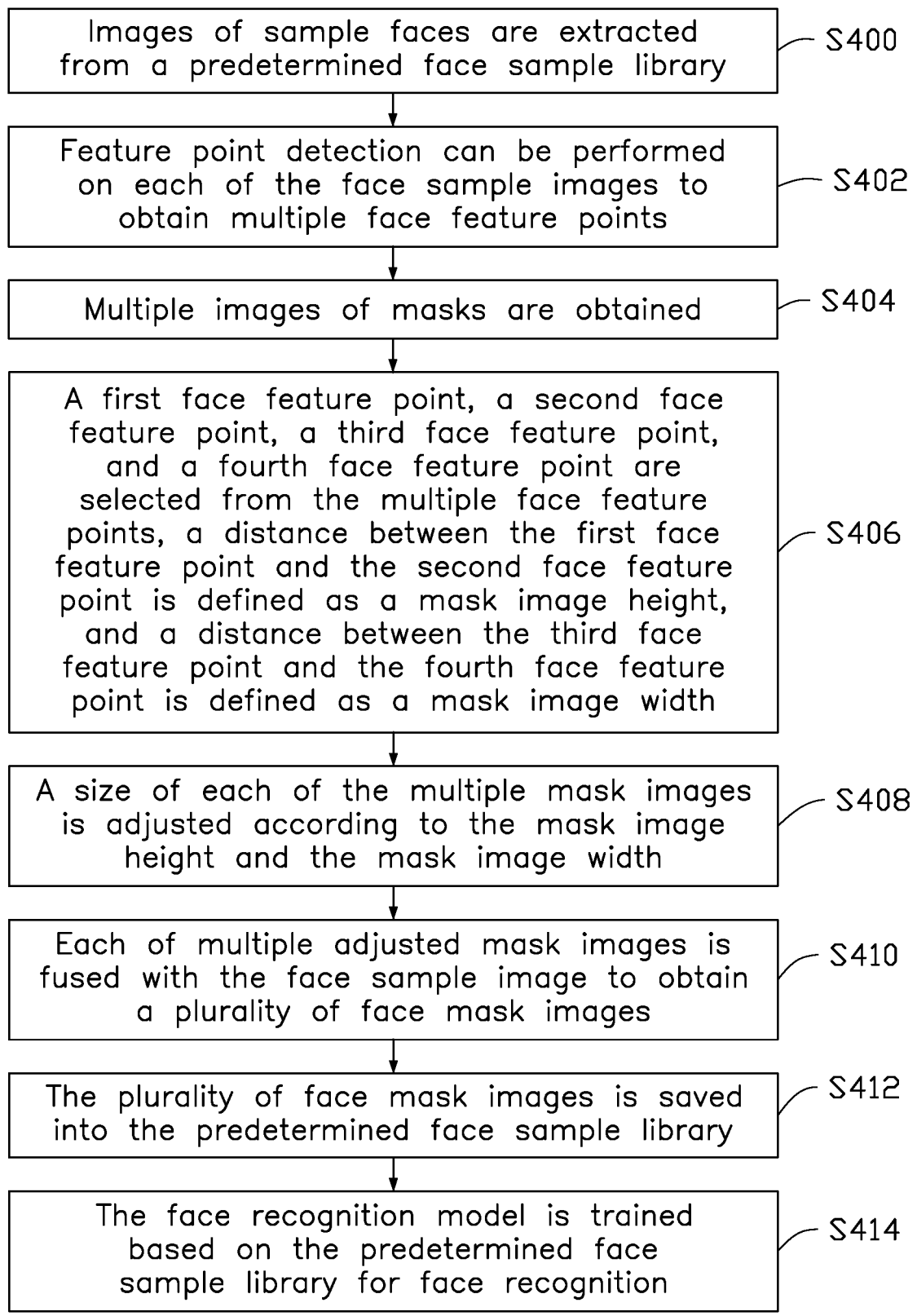
FIG. 4 is a flow chart of an embodiment of a face recognition method according to the present disclosure.

The face recognition device 100 can realize a human face recognition function. For example, the face recognition device 100 can be a consumer electronic device or a component in the consumer electronic device, for example the electronic device can be a mobile phone or a computer. The face recognition function can also improve data security or safety of the consumer electronic device. The face recognition device 100 can also be an access control device, a monitoring device, a component in the access control device, or a component in the monitoring device. The face recognition function can perform access control or security monitoring. The face recognition device 100 can comprise a data storage 10, a processor 20, and a face recognition procedure 30 stored in the data storage 10. The face recognition procedure 30 can be run on the processor 20. The processor 20 can execute the face recognition procedure 30 to realize an embodiment of a face recognition method, for example, blocks 400 to 414 as shown in FIG. 4. The processor 20 can also execute the face recognition procedure 30 to realize functions as described in FIG. 2, for example, modules 101 to 108 shown in FIG. 2.

In some embodiments, the face recognition device 100 can be an electronic device that is independent of the mobile phone, the computers, the access control device, or the monitoring device. A face recognition model can be trained by the face recognition device 100, and the face recognition model can be processed based on a predetermine processing method, such as a model quantization processing, and/or a model compression processing. The processed face recognition model can be integrated into the consumer electronic devices (such as the mobile phone or computer), to improve the safety of consumer electronic devices through face recognition. The processed face recognition model can also be integrated into the access control device or the monitoring device, to realize access control or security monitoring through face recognition.

Figure 2:
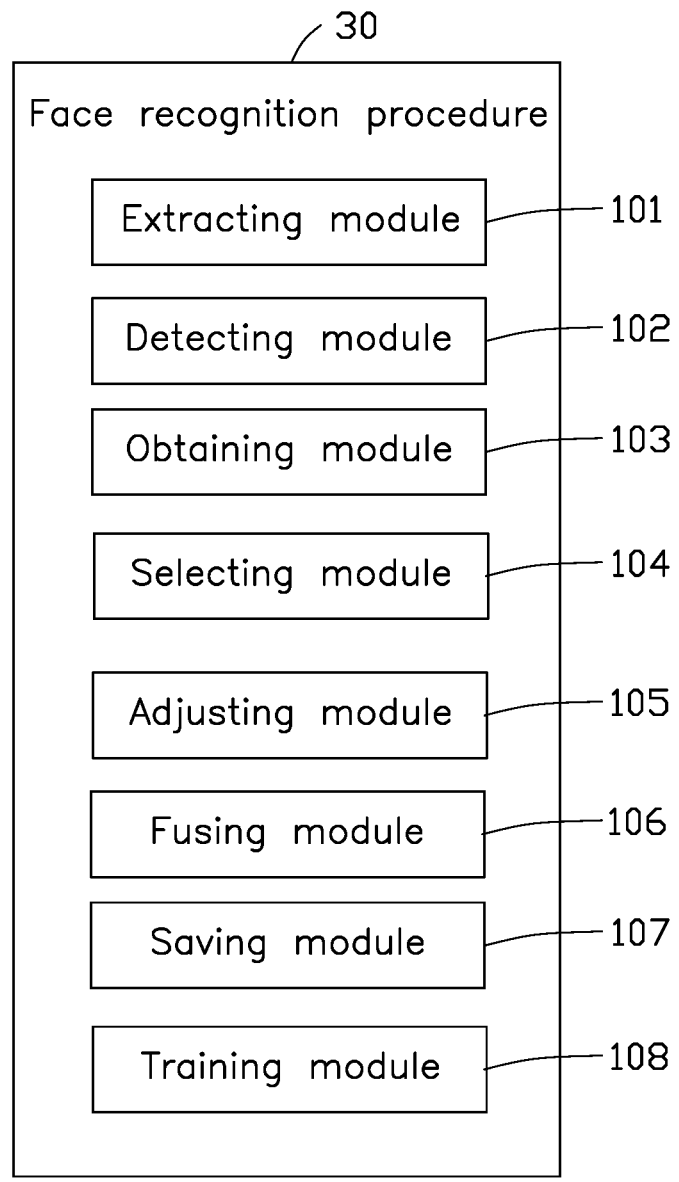
FIG. 2 is a block diagram of an embodiment of a face recognition procedure according to the present disclosure.

The face recognition procedure 30 can be divided into one or more modules. The one or more modules can be stored in the storage device 10 and executed by the processor 20. The one or more modules can be a series of program instruction segments, which can perform specific functions, and the instruction segment is configured to describe the execution process of the face recognition procedure 30 in the face recognition device 100. For example, the face recognition procedure 30 can be divided into an extracting module 101, a detecting module 102, an obtaining module 103, a selecting module 104, an adjusting module 105, a fusing module 106, a saving module 107, and a training module 108, as shown in FIG. 2. The detailed function of each module is described in FIG. 2.

The face recognition device 100 can further comprise a camera 40 and a display screen 50. The camera 40 is configured to capture images of faces, and the display screen 50 is configured to display the images of faces and a face recognition result of the images. It can be understood that, the block view exemplified in FIG. 1 is only an example of the face recognition device 100. The block view is not to be considered as limiting the face recognition device 100. Additional components can be added, or fewer components can be utilized, or some components can be combined, or different components can be used without departing from this disclosure. For example, the face recognition device 100 may comprise a network accessing device, a bus, or the like.

The processor 20 can be one or more central processing units, or it can be one or more other universal processors, digital signal processors, application specific integrated circuits, field-programmable gate arrays, or other programmable logic devices, discrete gate or transistor logic, discrete hardware components, and so on. The universal processor can be a microprocessor or the processor 20 can also be other types of processors, etc. The processor 20 can use various interfaces and buses to couple various parts of the face recognition device 100.

The data storage 10 is configured to store the face recognition procedure 30 and/or modules. The processor 20 can run or execute the face recognition procedure 30 and/or modules stored in the data storage 10, and accomplish the various functions of the face recognition device 100. In addition, the data storage 10 can comprise a high-speed random access memory and a non-transitory storage medium, such as hard disk, memory, plug-in hard disk, smart media card, secure digital, flash card, at least one disk storage device, flash memory, or other non-transitory storage medium, FIG. 2 illustrates a block diagram of an embodiment of the face recognition procedure.

The face recognition procedure 30 can comprise the extracting module 101, the detecting module 102, the obtaining module 103, the selecting module 104, the adjusting module 105, the fusing module 106, the saving module 107, and the training module 108. In one embodiment, the modules can be stored in the data storage 10 and can be run on the processor 20. It can be understood that, in other embodiments, the modules can be instructions or firmware which are resident in the processor 20.

The extracting module 101 is configured to extract images of sample faces from a predetermined face sample library.

In one embodiment, the predetermined face sample library can be pre-established for training a face recognition model. The face sample images in the predetermined face sample library may comprise multiple faces, and each of the different faces may comprise at least one face sample image. For example, each face can comprise a number of sample face images, a range of the number of sample face images is one to one hundred. The face sample image can be a headshot, a photo during an activity, etc., and a face area in the face sample image can be frontal or lateral etc. For example, the predetermined face sample library comprises face sample images of one hundred different persons and their faces, and each face comprises fifty face sample images.

In one embodiment, a face image can be captured by a camera. A resolution of the face image can be 1080P, 720P, etc. The face image can be processed in real time by an image processing software to obtain multiple face sample images. The image processing software can be pre-installed in a computer.

In one embodiment, multiple face sample images of a face can be directly captured by the camera.

In one embodiment, in the predetermined face sample library, each face corresponds to a folder, and face sample images of a face are stored in the same folder. The face sample images in the predetermined face sample library can be images of faces without a mask.

In one embodiment, the extracting module 101 can extract one or more face sample images from the predetermined face sample library at a time. The number of face sample images extracted by the extraction module 101 can be defined according to an actual requirement.

In one embodiment, the extracting module 101 can randomly extract a face sample image from the predetermined face sample library. The extracting module 101 can also extract a face sample image from the predetermined face sample library in a predetermined order. For example, the extracting module 101 extracts the face sample images in sequence according to an order of folders or an order of face sample images in each folder.

In one embodiment, the extraction module 101 can perform a preliminary process on each face sample image of the predetermined face sample library. The extraction module 101 can extract one or more face sample image from the predetermined face sample library after the preliminary process. The preliminary process can be selected from a group consisting of: face image righting, face image enhancing, and face image normalization. A face sample image with a correct face position can be obtained through the preliminary process of face image righting. A quality of a face sample image can be improved through the preliminary process of face image enhancing. A face sample image can be converted to a standard face image that comprises the same size and the same gray scale value range through the preliminary process of face image normalization.

The detecting module 102 is configured to perform feature point detection on each of the face sample images to obtain multiple face feature points.

Figure 3:
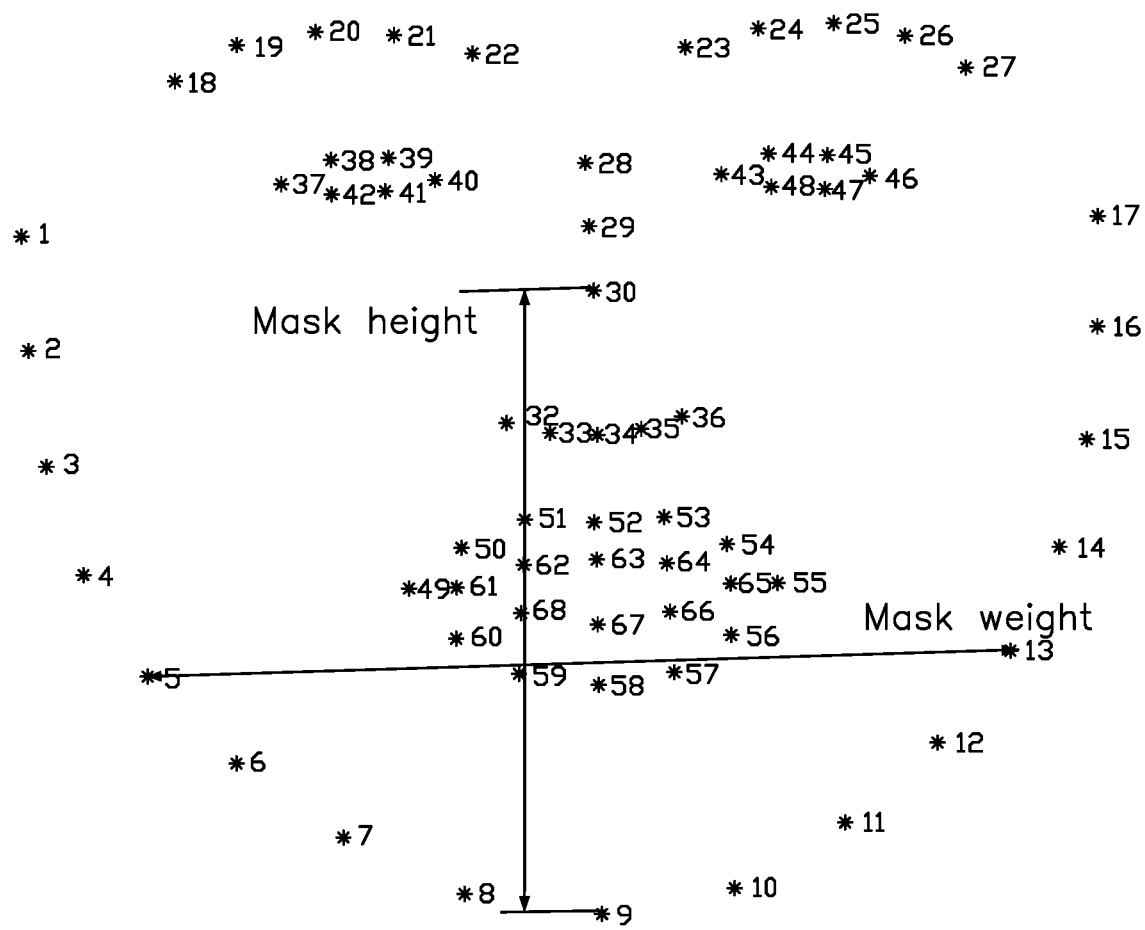
FIG. 3 is a distribution diagram of an embodiment of face feature points of a face sample image according to the present disclosure.

In one embodiment, when the extraction module 101 extracts a face sample image from the predetermined face sample library, the detecting module 102 can perform the feature point detection on the face sample image to obtain multiple face feature points. For example, the detecting module 102 can call a Dlib module to perform the feature point detection on the face sample image to obtain sixty-eight face feature points. The Dlib module comprises a pre-trained face feature point detection model. The detecting module 102 can calibrate the sixty-eight face feature points and add a serial number to each face feature point. Then the sixty-eight face feature points can be shown in the face sample image. For example, a distribution of the sixty-eight face feature points is shown in FIG. 3.

The obtaining module 103 is configured to obtain multiple images of masks.

In one embodiment, each of the multiple mask images can correspond to one type of mask. The multiple mask images can comprise N95 masks, PM2.5 masks, activated carbon masks, cotton masks, medical masks, etc. The obtaining module 103 can obtain multiple mask images of multiple mask types from a specified website or a specified server through a network. Multiple types of mask can be captured by a camera to obtain multiple mask images, and the obtaining module 103 can obtain the multiple mask images.

The selecting module 104 is configured to select a first face feature point, a second face feature point, a third face feature point, and a fourth face feature point from the multiple face feature points, define a distance between the first face feature point and the second face feature point as a mask image height, and define a distance between the third face feature point and the fourth face feature point as a mask image width.

In one embodiment, the first face feature point, the second face feature point, the third face feature point, and the fourth face feature point can be defined according to an actual requirement of face recognition. For example, as shown in FIG. 3, a face feature point of No. 9 can be defined as the first face feature point, a face feature point of No. 30 can be defined as the second face feature point. A distance between the face feature point of No. 9 and the face feature point of No. 30 is defined as the mask image height (a mask height is labeled in FIG. 3). A face feature point of No. 5 can be defined as the third face feature point, a face feature point of No. 13 can be defined as the fourth face feature point. A distance between the face feature point of No. 5 and the face feature point of No. 13 is defined as the mask image weight (a mask weight is labeled in FIG. 3). In other embodiments, for example, the face feature point of No. 9 is defined as the first face feature point, a face feature point of No. 29 is defined as the second face feature point, a face feature point of No. 4 is defined as the third face feature point, and a face feature point of No. 14 is defined as the fourth face feature point.

The adjusting module 105 is configured to adjust a size of each of the multiple mask images according to the mask image height and the mask image width.

In one embodiment, when the mask image height and the mask image width are determined, the adjusting module 105 can adjust the size of each of the multiple mask images according to the mask image height and mask image width. For example, the adjusting module 105 can perform a scaling process on each of the multiple mask images according to the mask image height and mask image width, so that a height of each of the multiple mask images is equal to the mask image height, and a width of each of the multiple mask images is equal to the mask image width.

In one embodiment, the height of each of the multiple mask images is not limited to the mask image height, and the width of each of the multiple mask images is not limited to the mask image width. Other adjustments can be performed on each of the multiple mask images, for example, the height of each of the multiple mask images can be equal to the mask image height, and the width of each of the multiple mask images can be equal to 1.1 times of the mask image width.

The fusing module 106 is configured to fuse each of multiple adjusted mask images with the face sample image to obtain a plurality of face mask images.

In one embodiment, when size adjustments of multiple mask images are completed, the fusing module 106 can fuse each of multiple adjusted mask images with one face sample image to obtain the plurality of face mask images.

For example, the extracting module 101 extracts a face sample image I1 from the predetermined face sample library, and the adjusting module 105 adjusts sizes of an N95 mask image I2, an PM2.5 mask image I3, an activated carbon mask image I4, a cotton mask image I5, and a medical mask image I6 obtained by the obtaining module 103. The fusion module 106 fuses the face sample image I1 with the adjusted N95 mask image I2 to obtain a new face sample image I11. The fusion module 106 fuses the face sample image I1 with the adjusted PM2.5 mask image I3 to obtain a new face sample image I12. The fusion module 106 fuses the face sample image I1 with the adjusted activated carbon mask image I4 to obtain a new face sample image I13. The fusion module 106 fuses the face sample image I1 with the adjusted cotton mask image I5 to obtain a new face sample image I14. The fusion module 106 fuses the face sample image I1 with the adjusted medical mask image I6 to obtain a new face sample image I15. In the predetermined face sample library, each face sample image can be fused with the N95 mask image I2, the PM2.5 mask image I3, the activated carbon mask image I4, the cotton mask image I5, and the medical mask image I6 to obtain five face mask images.

In one embodiment, the fusion module 106 can fuse each of multiple adjusted mask images with the face sample image based on an Open Source Computer Vision (OpenCV) algorithm to obtain the plurality of face mask images. In other embodiments, the fusion module 106 can fuse each of multiple adjusted mask images with the face sample image based on other image fusion algorithms.

The saving module 107 is configured to save the plurality of face mask images into the predetermined face sample library.

In one embodiment, when the plurality of face mask images is fused by the fusing module 106, the saving module 107 can save the plurality of face mask images into the predetermined face sample library, so that a face recognition model can be trained based on first face images with mask and second face images without mask.

The training module 108 is configured to train the face recognition model based on the predetermined face sample library for face recognition.

In one embodiment, when each face sample image in the predetermined face sample library is fused with the multiple mask images and the fused face sample image are saved to the predetermined face sample library, the training module 108 can train the face recognition model based on the predetermined face sample library.

In one embodiment, the training module 108 can use the predetermined face sample library to train a predetermined neural network (such as a convolutional neural network or a recurrent neural network) to obtain the face recognition model. When the face recognition model is trained, an object face image can be inputted to the face recognition model to obtain multiple facial feature vectors, for example, six hundreds and twelve facial feature vectors can be obtained to perform face recognition. A training method of the face recognition model can be a current training method of face recognition, which is not described in detail here.

In one embodiment, in order to display a name of each face during face recognition, a mapping relationship between each of the face sample images (comprising face sample images with mask and face sample images without mask) of the predetermined face sample library and face identity is established. Then, each of the face sample images can carry an identity tag. The training module 108 can train and obtain the face recognition model based on the face sample images carrying the identity tag. Then, the face recognition model can perform face recognition on a target face and simultaneously display a name of the face. If the target face is an unknown face, an identification of "Stranger" or "Unknown" can be outputted in the display.

In one embodiment, in order to display information of a masked face during face recognition, a mapping relationship between each of the face sample images (comprising face sample images with mask and face sample images without mask) of the predetermined face sample library and mask wearing information is established. Then, each of the face sample images can carry a mask wearing tag. The training module 108 can train and obtain the face recognition model based on the face sample images carrying the mask wearing tag. Then, the face recognition model can perform face recognition on a target face and simultaneously output a display of the target face wearing a mask.

In one embodiment, the face recognition procedure 30 can amplify face sample database of face recognition systems deployed on different platforms, and synthesize a new face sample database with masks. The new masked faces sample database can be imported into the original face sample database, and the face recognition systems can successfully recognize the identification of a target face wearing a mask. For example, the platforms can be a neural compute stick (NCS) face recognition platform, a Dlib face recognition platform, or an azure face recognition platform.

In one embodiment, when the face recognition model is trained based on the predetermined face sample library by the training module 108, the face recognition model can be processed based on a model quantization processing and/or a model compression processing, and the face recognition model can be integrated into a terminal device.

FIG. 4 illustrates a flow chart of an embodiment of a face recognition method. A order of blocks in the flow chart can be adjusted and some blocks can be omitted according to different face recognition requirements.

In block S400, images of sample faces are extracted from a predetermined face sample library.

In one embodiment, the predetermined face sample library can be pre-established for training a face recognition model. The face sample images in the predetermined face sample library may comprise multiple faces, and each of the different faces may comprise at least one face sample image. For example, each face can comprise a number of sample face images, a range of the number of sample face images is one to one hundred. The face sample image can be a headshot, a photo during an activity, etc., and a face area in the face sample image can be frontal or lateral etc. For example, the predetermined face sample library comprises face sample images of one hundred different persons and their faces, and each face comprises fifty face sample images.

In one embodiment, a face image can be captured by a camera. A resolution of the face image can be 1080P, 720P, etc. The face image can be processed in real time by an image processing software to obtain multiple face sample images. The image processing software can be pre-installed in a computer.

In one embodiment, multiple face sample images of a face identity can be directly captured by the camera.

In one embodiment, in the predetermined face sample library, each face corresponds to a folder, and face sample images of a face are stored in the same folder. The face sample images in the predetermined face sample library can be images of faces without a mask.

In one embodiment, one or more face sample images can be extracted from the predetermined face sample library at a time. The number of face sample images extracted from the predetermined face sample library can be defined according to an actual requirement.

In one embodiment, a face sample image can be randomly extracted from the predetermined face sample library. A face sample image can also be extracted from the predetermined face sample library in a predetermined order. For example, the face sample images are extracted in sequence according to an order of folders or an order of face sample images in each folder.

In one embodiment, a preliminary process can be performed on each face sample image of the predetermined face sample library. One or more face sample image can be extracted from the predetermined face sample library after the preliminary process. The preliminary process can be selected from a group consisting of face image righting, face image enhancing, and face image normalization. A face sample image with a correct face position can be obtained through the preliminary process of face image righting. A quality of a face sample image can be improved through the preliminary process of face image enhancing. A face sample image can be converted to a standard face image that comprises the same size and the same gray scale value range through the preliminary process of face image normalization.

In block S402, feature point detection can be performed on each of the face sample images to obtain multiple face feature points.

In one embodiment, when a face sample image is extracted from the predetermined face sample library, the feature point detection can be performed on the face sample image to obtain multiple face feature points. For example, a Dlib module is called to perform the feature point detection on the face sample image to obtain sixty-eight face feature points. The Dlib module comprises a pre-trained face feature point detection model. The sixty-eight face feature points can be calibrated, and a serial number is added to each face feature point. Then the sixty-eight face feature points can be shown in the face sample image. For example, a distribution of the sixty-eight face feature points is shown in FIG. 3.

In block S404, multiple images of masks are obtained.

In one embodiment, each of the multiple mask images can correspond to one type of mask. The multiple mask images can comprise N95 masks, PM2.5 masks, activated carbon masks, cotton masks, medical masks, etc. Multiple mask images of multiple mask types can be obtained from a specified website or a specified server through a network. Multiple types of mask can be captured by a camera to obtain multiple mask images, and the multiple mask images can be obtained.

In block S406, a first face feature point, a second face feature point, a third face feature point, and a fourth face feature point are selected from the multiple face feature points, a distance between the first face feature point and the second face feature point is defined as a mask image height, and a distance between the third face feature point and the fourth face feature point is defined as a mask image width.

In one embodiment, the first face feature point, the second face feature point, the third face feature point, and the fourth face feature point can be defined according to an actual requirement of face recognition. For example, as shown in FIG. 3, a face feature point of No. 9 can be defined as the first face feature point, a face feature point of No. 30 can be defined as the second face feature point. A distance between the face feature point of No. 9 and the face feature point of No. 30 is defined as the mask image height (a mask height is labeled in FIG. 3). A face feature point of No. 5 can be defined as the third face feature point, a face feature point of No. 13 can be defined as the fourth face feature point. A distance between the face feature point of No. 5 and the face feature point of No. 13 is defined as the mask image weight (a mask weight is labeled in FIG. 3). In other embodiments, for example, the face feature point of No. 9 is defined as the first face feature point, a face feature point of No. 29 is defined as the second face feature point, a face feature point of No. 4 is defined as the third face feature point, and a face feature point of No. 14 is defined as the fourth face feature point.

In block S408, a size of each of the multiple mask images is adjusted according to the mask image height and the mask image width.

In one embodiment, when the mask image height and the mask image width are determined, the size of each of the multiple mask images can be adjusted according to the mask image height and mask image width. For example, a scaling process can be performed on each of the multiple mask images according to the mask image height and mask image width, so that a height of each of the multiple mask images is equal to the mask image height, and a width of each of the multiple mask images is equal to the mask image width.

In one embodiment, the height of each of the multiple mask images is not limited to the mask image height, and the width of each of the multiple mask images is not limited to the mask image width. Other adjustments can be performed on each of the multiple mask images, for example, the height of each of the multiple mask images can be equal to the mask image height, and the width of each of the multiple mask images can be equal to 1.1 times of the mask image width.

In block S410, each of multiple adjusted mask images is fused with the face sample image to obtain a plurality of face mask images.

In one embodiment, when size adjustments of multiple mask images are completed, each of multiple adjusted mask images can be fused with one face sample image to obtain the plurality of face mask images.

For example, a face sample image I1 is extracted from the predetermined face sample library, and sizes of an N95 mask image I2, an PM2.5 mask image I3, an activated carbon mask image I4, a cotton mask image I5, and a medical mask image I6 are adjusted. The face sample image I1 can be fused with the adjusted N95 mask image I2 to obtain a new face sample image I11. The face sample image I1 can be fused with the adjusted PM2.5 mask image I3 to obtain a new face sample image I12. The face sample image I1 can be fused with the adjusted activated carbon mask image I4 to obtain a new face sample image I13. The face sample image I1 can be fused with the adjusted cotton mask image I5 to obtain a new face sample image I14. The face sample image I1 can be fused with the adjusted medical mask image I6 to obtain a new face sample image I15. In the predetermined face sample library, each face sample image can be fused with the N95 mask image I2, the PM2.5 mask image I3, the activated carbon mask image I4, the cotton mask image I5, and the medical mask image I6 to obtain five face mask images.

In one embodiment, each of multiple adjusted mask images can be fused with the face sample image based on an Open Source Computer Vision (OpenCV) algorithm to obtain the plurality of face mask images. In other embodiments, each of multiple adjusted mask images can be fused with the face sample image based on other image fusion algorithms.

In block S412, the plurality of face mask images is saved into the predetermined face sample library.

In one embodiment, when the plurality of face mask images is fused, the plurality of face mask images can be saved into the predetermined face sample library, so that a face recognition model can be trained based on first face images with mask and second face images without mask.

In block S414, the face recognition model is trained based on the predetermined face sample library for face recognition.

In one embodiment, when each face sample image in the predetermined face sample library is fused with the multiple mask images and the fused face sample image are saved to the predetermined face sample library, the face recognition model can be trained based on the predetermined face sample library.

In one embodiment, the predetermined face sample library is configured to train a predetermined neural network (such as a convolutional neural network or a recurrent neural network) to obtain the face recognition model. When the face recognition model is trained, an object face image can be inputted to the face recognition model to obtain multiple facial feature vectors, for example, six hundreds and twelve facial feature vectors can be obtained to perform face recognition. A training method of the face recognition model can be a current training method of face recognition, which is not described in detail here.

In one embodiment, in order to display a name of each face during face recognition, a mapping relationship between each of the face sample images (comprising face sample images with mask and face sample images without mask) of the predetermined face sample library and face identity is established. Then, each of the face sample images can carry an identity tag. The face recognition model can be trained and obtained based on the face sample images carrying the identity tag. Then, the face recognition model can perform face recognition on a target face and simultaneously display a name of the face. If the target face is an unknown face, an identification of "Stranger" or "Unknown" can be outputted in the display.

In one embodiment, in order to display information of a masked face during face recognition, a mapping relationship between each of the face sample images (comprising face sample images with mask and face sample images without mask) of the predetermined face sample library and mask wearing information is established. Then, each of the face sample images can carry a mask wearing tag. The face recognition model can be trained and obtained based on the face sample images carrying the mask wearing tag. Then, the face recognition model can perform face recognition on a target face and simultaneously output a display of the target face wearing a mask.

In one embodiment, the face recognition procedure 30 can amplify face sample database of face recognition systems deployed on different platforms, and synthesize a new face sample database with masks. The new masked faces sample database can be imported into the original face sample database, and the face recognition systems can successfully recognize the identification of a target face wearing a mask. For example, the platforms can be a neural compute stick (NCS) face recognition platform, a Dlib face recognition platform, or an azure face recognition platform.

In one embodiment, when the face recognition model is trained based on the predetermined face sample library, the face recognition model can be processed based on a model quantization processing and/or a model compression processing, and the face recognition model can be integrated into a terminal device.

According to the face recognition device, the face recognition method, and the non-transitory readable storage medium, faces can be recognized and accurately identified when people wear masks, and face recognition experience of masked people can be improved.

For those skilled in the art, some changes or adjustments can be made in the detail according to an actual requirement, and these changes and adjustments should fall in the scope of the application.

What is claimed is:

1. A face recognition method comprising:
    extracting images of sample faces from a predetermined face sample library;
    performing feature point detection on each of the images of sample faces to obtain multiple face feature points;
    obtaining multiple mask images, wherein each of the multiple mask images corresponds to one type of mask;
    selecting a first face feature point, a second face feature point, a third face feature point, and a fourth face feature point from the multiple face feature points, defining a distance between the first face feature point and the second face feature point as a mask image height, and defining a distance between the third face feature point and the fourth face feature point as a mask image width;
    adjusting a size of each of the multiple mask images according to the mask image height and the mask image width;
    fusing each of multiple adjusted mask images with an image of sample face to obtain a plurality of face mask images;
    saving the plurality of face mask images to the predetermined face sample library; and
    training a face recognition model based on the predetermined face sample library for face recognition.

2. The face recognition method of claim 1, wherein the images of sample faces of the predetermined face sample library comprise multiple human faces, and each of the multiple human faces comprises at least one face sample image, the method of training the face recognition model based on the predetermined face sample library comprises:
    training the face recognition model based on the predetermined face sample library when each of the images of sample faces of the predetermined face sample library is completed to fuse with the multiple mask images.

3. The face recognition method of claim 2, further comprising:
  establishing a mapping relationship between each of the images of sample faces of the predetermined face sample library and face identity information, to make each of the images of sample faces carrying a face identity tag.

4. The face recognition method of claim 2, further comprising:
  establishing a mapping relationship between each of the images of sample faces of the predetermined face sample library and mask wearing information, to make each of the images of sample faces carrying a mask wearing tag.

5. The face recognition method of claim 1, wherein the method of performing the feature point detection on each of the images of sample faces to obtain the multiple face feature points comprises:
  performing the feature point detection on the images of sample faces based on a predetermined face feature detection model;
  calibrating the multiple face feature points detected by the predetermined face feature detection model, and adding a serial number to each of the multiple face feature points; and
  selecting face feature points with specified serial numbers as the first face feature point, the second face feature point, the third face feature point, and the fourth face feature point.

6. The face recognition method of claim 1, wherein the method of adjusting the size of each of the multiple mask images according to the mask image height and the mask image width comprises:
  performing a scaling process on each of the multiple mask images, wherein a height of each of the multiple mask images is equal to the mask image height, and a width of each of the multiple mask images is equal to the mask image width.

7. The face recognition method of claim 1, wherein the method of fusing each of multiple adjusted mask images with the image of sample face to obtain the plurality of face mask images comprises:
  fusing each of multiple adjusted mask images with the image of sample face based on an OpenCV algorithm to obtain the plurality of face mask images.

8. The face recognition method of claim 1, further comprising:
  performing a preliminary process on each face sample image of the predetermined face sample library, wherein the preliminary process is selected from a group consisting of: face image righting, face image enhancing, and face image normalization.

9. A face recognition device comprising:
  a processor; and
  a storage device storing one or more programs which when executed by the processor, cause the processor to:
    extract images of sample faces from a predetermined face sample library;
    perform feature point detection on each of the images of sample faces to obtain multiple face feature points;
    obtain multiple mask images, wherein each of the multiple mask images corresponds to one type of mask;
    select a first face feature point, a second face feature point, a third face feature point, and a fourth face feature point from the multiple face feature points,
    define a distance between the first face feature point and the second face feature point as a mask image height, and define a distance between the third face feature point and the fourth face feature point as a mask image width;
    adjust a size of each of the multiple mask images according to the mask image height and the mask image width;
    fuse each of multiple adjusted mask images with an image of sample face to obtain a plurality of face mask images;
    save the plurality of face mask images to the predetermined face sample library; and
    train a face recognition model based on the predetermined face sample library for face recognition.

10. The face recognition device of claim 9, wherein the images of sample faces of the predetermined face sample library comprise multiple human faces, each of the multiple human faces comprises at least one face sample image, and the at least one processor training the face recognition model based on the predetermined face sample library comprises:
  training the face recognition model based on the predetermined face sample library when each of the images of sample faces of the predetermined face sample library is completed to fuse with the multiple mask images.

11. The face recognition device of claim 10, wherein the at least one processor is further configured to:
  establish a mapping relationship between each of the images of sample faces of the predetermined face sample library and face identity information, to make each of the images of sample faces carrying a face identity tag.

12. The face recognition device of claim 10, wherein the at least one processor is further configured to:
  establish a mapping relationship between each of the images of sample faces of the predetermined face sample library and mask wearing information, to make each of the images of sample faces carrying a mask wearing tag.

13. The face recognition device of claim 9, wherein the at least one processor performing the feature point detection on each of the images of sample faces to obtain the multiple face feature points comprises:
  performing the feature point detection on the images of sample faces based on a predetermined face feature detection model;
  calibrating the multiple face feature points detected by the predetermined face feature detection model, adding a serial number to each of the multiple face feature points; and
  selecting face feature points with specified serial numbers as the first face feature point, the second face feature point, the third face feature point, and the fourth face feature point.

14. The face recognition device of claim 9, wherein the at least one processor adjusting the size of each of the multiple mask images according to the mask image height and the mask image width comprises:
  performing a scaling process on each of the multiple mask images, wherein a height of each of the multiple mask images is equal to the mask image height, and a width of each of the multiple mask images is equal to the mask image width.

15. The face recognition device of claim 9, wherein the at least one processor fusing each of multiple adjusted mask images with the image of sample face to obtain the plurality of face mask images comprises:

fusing each of multiple adjusted mask images with the image of sample face based on an OpenCV algorithm to obtain the plurality of face mask images.

16. The face recognition device of claim 9, wherein the at least one processor is further configured to:

perform a preliminary process on each face sample image of the predetermined face sample library, wherein the preliminary process is selected from a group consisting of: face image righting, face image enhancing, and face image normalization.

17. A non-transitory storage medium having stored thereon instructions that, when executed by a processor of an electronic device, cause the electronic device to perform a face recognition method, the face recognition method comprising:

extracting images of sample faces from a predetermined face sample library;

performing feature point detection on each of the images of sample faces to obtain multiple face feature points;

obtaining multiple mask images, wherein each of the multiple mask images corresponds to one type of mask;

selecting a first face feature point, a second face feature point, a third face feature point, and a fourth face feature point from the multiple face feature points, defining a distance between the first face feature point and the second face feature point as a mask image height, and defining a distance between the third face feature point and the fourth face feature point as a mask image width;

adjusting a size of each of the multiple mask images according to the mask image height and the mask image width;

fusing each of multiple adjusted mask images with the face sample image to obtain a plurality of face mask images;

saving the plurality of face mask images to the predetermined face sample library; and training a face recognition model based on the predetermined face sample library for face recognition.

* * * * *